(12) United States Patent
Steiner et al.

(10) Patent No.: US 9,787,494 B2
(45) Date of Patent: Oct. 10, 2017

(54) METHOD FOR TRANSMITTING MESSAGES IN A COMPUTER NETWORK, AND COMPUTER NETWORK

(71) Applicant: FTS Computertechnik GmbH, Vienna (AT)

(72) Inventors: Wilfried Steiner, Vienna (AT); Günther Bauer, Vienna (AT)

(73) Assignee: FTS Computertechnik GmbH, Vienna (AT)

( * ) Notice: Subject to any disclaimer, the term of this patent is extended or adjusted under 35 U.S.C. 154(b) by 0 days.

(21) Appl. No.: 15/031,861

(22) PCT Filed: Oct. 15, 2014

(86) PCT No.: PCT/AT2014/050247
§ 371 (c)(1),
(2) Date: Apr. 25, 2016

(87) PCT Pub. No.: WO2015/058224
PCT Pub. Date: Apr. 30, 2015

(65) Prior Publication Data
US 2016/0269196 A1 Sep. 15, 2016

(30) Foreign Application Priority Data
Oct. 25, 2013 (AT) .............................. A 50691/2013

(51) Int. Cl.
*H04L 12/28* (2006.01)
*H04L 12/40* (2006.01)
(Continued)

(52) U.S. Cl.
CPC .. *H04L 12/40182* (2013.01); *H04L 12/40189* (2013.01); *H04L 49/254* (2013.01); *H04L 61/2007* (2013.01); *H04L 61/2038* (2013.01)

(58) Field of Classification Search
CPC ......... H04L 12/40182; H04L 12/40189; H04L 49/254; H04L 61/2038; H04L 61/2007
(Continued)

(56) References Cited

U.S. PATENT DOCUMENTS

4,747,097 A * 5/1988 Ohya .................... H04L 12/433
370/222
5,321,689 A * 6/1994 Suzuki .............. H04L 12/40013
370/228
(Continued)

*Primary Examiner* — Thai Hoang
(74) *Attorney, Agent, or Firm* — Eversheds Sutherland (US) LLP (57) ABSTRACT

The invention relates to a method for transmitting messages in a computer network, and to a computer network of this type. The computer network comprises computing nodes (101-105), said computing nodes (101-105) being interconnected via at least one star coupler (201) and/or at least one multi-hop network (1000), wherein each computing node (101-105) is connected via at least one communication line (110) to the at least one star coupler (201) and/or the at least one multi-hop network (1000), and wherein the computing nodes (101-105) exchange Ethernet messages with one another and with the at least one star coupler (201) and/or the at least one multi-hop network (1000). A set of two or more components are directly connected to one another in each case by two or more communication lines (110, 111), wherein each component in the set is either a computing node (101-105) or a star coupler (201), and sending components in the set of components send to at least two of the two or more communication lines (110, 111) at least a proportion of the Ethernet messages that are to be sent, and receiving components in the set of components then accept and/or forward at least a proportion of the Ethernet messages received via the two or more communication lines (110, 111) only if at least two identical messages are received via at least two different communication lines.

42 Claims, 7 Drawing Sheets

(51) Int. Cl.
*H04L 12/937* (2013.01)
*H04L 29/12* (2006.01)

(58) Field of Classification Search
USPC ............... 370/216–228, 235–240, 241–253,
370/255–258, 400–408
See application file for complete search history.

(56) References Cited

U.S. PATENT DOCUMENTS

| | | | |
|---|---|---|---|
| 5,434,972 A * | 7/1995 | Hamlin | G06F 15/17343 370/256 |
| 5,852,600 A * | 12/1998 | Russ | H04L 69/40 340/2.9 |
| 7,283,466 B1 * | 10/2007 | Chen | H04L 45/02 370/225 |
| 2002/0001288 A1 * | 1/2002 | Fukunaga | H04L 12/40052 370/252 |
| 2002/0141427 A1 * | 10/2002 | McAlpine | H04L 47/39 370/413 |
| 2003/0142665 A1 * | 7/2003 | Van Wageningen | H04Q 11/0478 370/386 |
| 2003/0206516 A1 * | 11/2003 | Chen | H04J 3/085 370/227 |
| 2004/0047360 A1 * | 3/2004 | Myers | H04L 45/06 370/406 |
| 2011/0013522 A1 * | 1/2011 | Kishigami | H04L 12/12 370/242 |
| 2014/0219120 A1 * | 8/2014 | Larsson | H04W 52/267 370/252 |

\* cited by examiner

METHOD FOR TRANSMITTING MESSAGES IN A COMPUTER NETWORK, AND COMPUTER NETWORK

The invention relates to a method for transmitting messages in a computer network, wherein the computer network comprises computing nodes, said computing nodes being interconnected via at least one star coupler and/or at least one multi-hop network, wherein each computing node is connected via at least one communication line to the at least one star coupler and/or the at least one multi-hop network, and wherein the computing nodes exchange Ethernet messages with one another and with the at least one star coupler and/or the at least one multi-hop network.

The invention also relates to a computer network, in particular a distributed real-time computer network, for transmitting messages, wherein the computer network comprises computing nodes, said computing nodes being interconnected via at least one star coupler and/or at least one multi-hop network, wherein each computing node is connected via at least one communication line to the at least one star coupler and/or the at least one multi-hop network, and wherein the computing nodes exchange Ethernet messages with one another and with the at least one star coupler and/or the at least one multi-hop network.

The computer network is a time-controlled Ethernet computer network, for example.

The present invention lies in the field of computer technology. It describes an innovative method and supporting hardware for use of an Ethernet network for safety-critical applications.

In particular, the invention lies in the field of distributed real-time systems, wherein such a real-time system consists of two types of active components: computing nodes and star couplers. Computing nodes execute functions such as the measurement of properties of physical processes by means of suitable sensors, the calculation of control variables, or the activation of actuators, such as valves. Computing nodes are connected to other computing nodes and/or star couplers means of bidirectional lines. Furthermore, star couplers can also be connected to one another by bidirectional lines. The exchange of information between components is message-oriented, and in the following description we assume that the exchange of information uses Ethernet messages. Messages can have different identities, and all messages with the same identity form a "message flow".

Real-time systems as described above are used inter alia in safety-critical systems, for example for controlling an aircraft. In systems of this type it must be ensured that the network continues to function even if individual components, i.e. computing nodes or star couplers, are defective. This problem is referred to in the research and development field as fault tolerance.

The object of the invention is to specify a solution for how an Ethernet network can perform safety-critical tasks and how the operability of the network is provided even in the event of a fault.

This problem is solved with a method of the type mentioned in the introduction and also with a computer network as mentioned in the introduction in that, in accordance with the invention, a) in a set of components selected from those components comprised by the computer network, i.e. computing nodes and/or star couplers and/or multi-hop networks, wherein the set comprises two or more components of this type, those components within the set that are directly interconnected are directly interconnected in each case by two or more communication lines, and b) sending components in the set of components send to at least two of the two or more communication lines at least a proportion of the Ethernet messages that are to be sent, and c) receiving components in the set of components then accept and/or forward at least a proportion of the Ethernet messages received via the two or more communication lines only if at least two identical messages are received via at least two different communication lines.

The present invention describes how, by means of suitable measures, particularly by use of a plurality of redundant parts and interconnection thereof, an Ethernet network can be designed in such a way that it can perform safety-critical tasks and the operability of the network is provided even in the event of a fault.

The set of components can comprise for example precisely two components, for example a star coupler and a computing node, however this set can also be formed by all components (in the form of computing nodes, star couplers and/or multi-hop networks which are part of the computer network or form this) comprised by the computer network.

Preferred embodiments of the method according to the invention and of the computer network according to the invention, which can be implemented in isolation or in any combination with one another, are described hereinafter:

the sending components in the set of components and/or the receiving components in the set of components consist in each case of two or more fault-containment units;

in the sending and/or receiving components in the set of components, the fault-containment units are selected in such a way that, for each component, different MAC layers are located in different fault-containment units, wherein different MAC layers of a component are structurally identical;

in the sending and/or receiving components in the at least one set of components, the fault-containment units are selected in such a way that, for each component, each MAC layer is allocated to precisely one of two fault-containment units;

in the sending components in the set of components, the fault-containment units are selected in such a way that, for each component, different PHY layers are located in different fault-containment units;

in the sending and/or receiving components in the set of components, the fault-containment units are selected in such a way that, for each component, each PHY layer is allocated to precisely one of two fault-containment units;

in the sending and/or receiving components in the set of components, the fault-containment units are selected in such a way that each MAC layer and/or PHY layer is allocated to precisely one of two fault-containment units;

a receiving component in the set of components forwards only one of the identical messages received by the receiving component at the least two different communication lines;

at least a proportion of the Ethernet messages, possibly also all of said messages, is/are sent by the computing nodes in a time-controlled manner;

at least a proportion of the Ethernet messages is forwarded by the star couplers in a time-controlled manner;

the SAE AS602 standard or a standard based thereon or a standard following on therefrom is used in order to communicate in a time-controlled manner;

the IEEE 802.1AS standard or a standard based thereon or a standard following on therefrom is used in order to communicate in a time-controlled manner;

the IEEE 1588 standard or a standard based thereon or a standard following on therefrom is used in order to communicate in a time-controlled manner;

the components in the set of components use the two or more communication lines, at moments at which no identical Ethernet messages are transmitted via two or more communication lines, for the transmission of different Ethernet messages;

a link aggregation method according to standard IEEE 802.1AX or a standard based thereon or a standard following on therefrom is used to send different messages via the two or more communication lines;

the set of components contains exclusively star couplers, i.e. two or more star couplers;

the error-containment units are selected in such a way that each component in itself forms an error-containment unit;

the error-containment units are selected in such a way that each star coupler forms an error-containment unit;

the error-containment units are selected in such a way that at least one computing node together with in each case at least one star coupler forms an error-containment unit;

the error-containment units are selected in such a way that in each case precisely one computing node together with precisely one star coupler forms an error-containment unit;

each component in the set of components is a sending component, a receiving component, or both a sending and a receiving component.

A central element of the invention is the suitable choice of "fault-containment" units and "error-containment" units. A fault-containment unit is defined during the development of a safety-critical system and classifies those parts of a system that are assumed to have failed as a whole in the event of a fault. An example of a fault-containment unit is a computer chip. A characterising property of a fault-containment unit is the failure mode. The failure mode of a fault-containment unit describes how the unit may behave in the event of a fault. In the case of the computer chip an example of a failure mode is fail-silent, which means that the computer chip no longer generates any signals at its outputs in the event of a fault. Since a detailed description of the failure mode is complicated, a pessimistic assumption is often made in safety-critical systems. A pessimistic assumption of a failure mode is for example "arbitrarily defective", which means that the computer chip can generate arbitrary signals at its interfaces.

An error-containment unit is likewise defined during the development of a safety-critical system and describes how the fault-containment units can be interconnected in such a way that the failure mode of the error-containment unit is less critical, i.e. is more benign than the failure mode of the fault-containment units constituting the error-containment unit. An example of an error-containment unit consists of two fault-containment units (for example two computer chips), wherein both fault-containment units can fail in an arbitrarily defective manner. The error-containment unit now interconnects both fault-containment units in such a way that they monitor one another. If one of the fault-containment units is defective and starts to generate defective signals, this is identified by the other fault-containment unit, which switches off the defective (fault-containment) unit as well as itself (for example via a common power supply). This behaviour of the fault-containment units results in a benign failure mode of the error-containment unit, specifically a fail-silent failure mode. For the sake of completeness, it is mentioned that one of the basic assumptions that must be made when designing error-containment units is the assumption of sufficiently independent failure of fault-containment units. In the above example it is assumed for example that only one of the fault-containment units is defective at any moment in time.

The present invention describes how, in an Ethernet-based network, fault-containment and error-containment can be expediently selected such that the distributed real-time system can be used in safety-critical applications. The invention also describes how the fault-containment units can be productively interconnected. In addition, an implementation of the invention is described in which the Ethernet messages are sent in a time-controlled manner, whereby the implementation effort of the invention is kept to a minimum.

In an Ethernet network what is known as the MAC (media access) layer and what is known as the PHY (physical) layer are different from one another. When sending Ethernet messages the MAC layer is responsible for processing the information to be sent and delivers the data via a standardised interface to the PHY layer, which then sends the messages via a communication line. These standardised interfaces are for example "MIP" for 100 Mbit/Sec Ethernet or "GMII" for 1 Gbit/Sec Ethernet. Upon receipt, the PHY receives the data from the communication line and processes said data in conformity with the interface and transmits the data to the MAC layer. The MAC layer receives and delivers the data either from/to a superordinate application layer (APP) or from/to functions directly implemented in the MAC layer. In practice either each of these layers (APP, MAC, PHY) can be provided in a separate computer chip or a plurality of layers can be provided in a common computer chip. Since a computer chip is typically assumed to be a fault-containment unit, this separate or joint provision of the layers in a computer chip means that one or more layers in turn forms/form a fault-containment unit.

The invention will be explained in greater detail hereinafter on the basis of an exemplary implementation with reference to the drawing.

Figure 1:
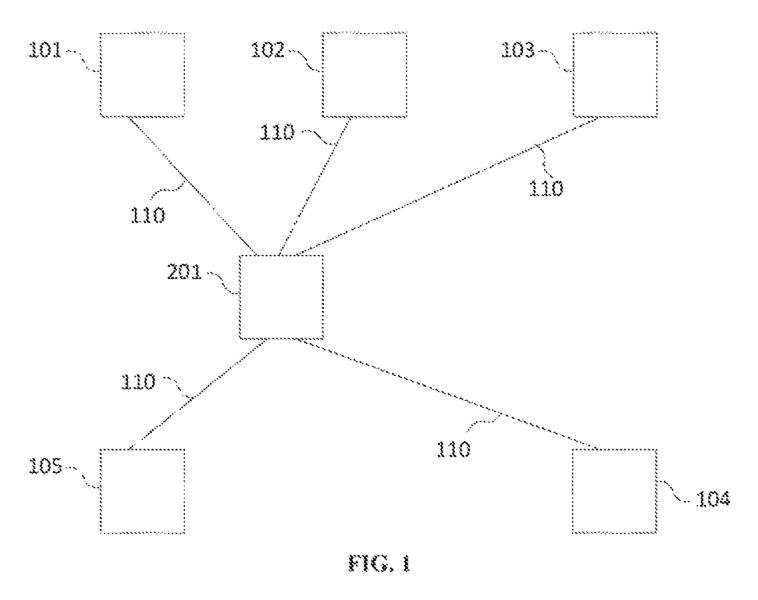
FIG. 1 shows an example of an Ethernet network, which implements time-controlled communication and in which computing nodes 101-105 are connected to a star coupler 201 by means of bidirectional communication lines 110.

FIG. 1 shows an example of an Ethernet network, in which computing nodes 101-105 are connected to a star coupler 201 by means of bidirectional communication lines 110. The computing nodes 101-105 exchange Ethernet messages with one another by sending these messages to the star coupler 201, which forwards the messages to the appropriate receiver. Furthermore, a star coupler 201 can also itself generate Ethernet messages and send these to computing nodes 101-105

Figure 2:
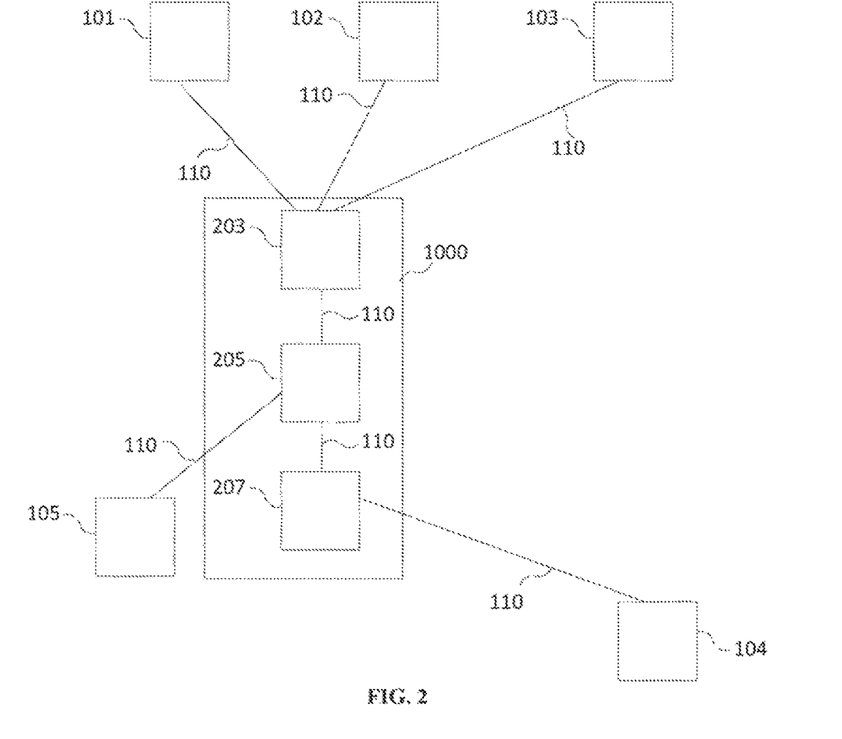
FIG. 2 shows a further example of an Ethernet network.

In FIG. 2 it is illustrated that a plurality of star couplers 201 can also be interconnected and that each computing node 101-105 is connected only to a subset of these star couplers 203, 205, 207. Two computing nodes can then also communicate via two or more star couplers 203, 205, 207. Network structures of this type are referred to as multi-hop networks 1000. Multi-hop networks will not be discussed explicitly in the following description, however it is prior art that individual star couplers 201 (FIG. 1) can be replaced by a multi-hop network 1000 (FIG. 2).

Figure 3:
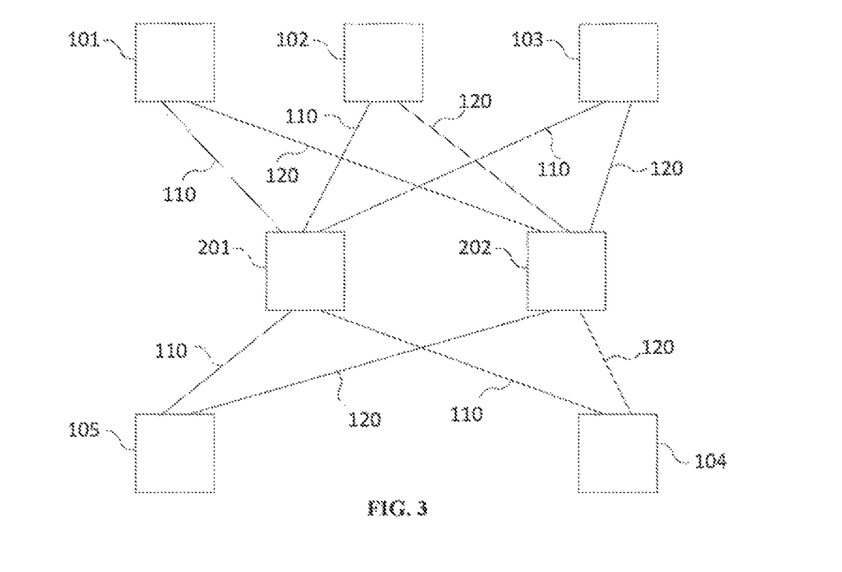
FIG. 3 shows an example of an Ethernet network, which implements time-controlled communication and in which computing nodes 101-105 are connected to redundant star couplers 201, 202 by means of redundant bidirectional communication lines 110, 120.

FIG. 3 shows an example of an Ethernet network in which computing nodes 101-105 are connected to redundant star couplers 201, 202 by means of redundant bidirectional communication lines 110, 120. Computing nodes can now communicate with one another via both star couplers 201, 202, also simultaneously. This means that the redundancy in this network tolerates the failure of individual components. If, for example, computing node 101 wishes to communicate with computing node 102, it can send messages both to the star coupler 201 and to the star coupler 202. In a situation in which there are no faults, both star couplers 201 and 202 then forward the messages to the computing node 102. If, however, one of the two star couplers 201 or 202 is defective, it is in any case guaranteed that the non-defective star coupler 201 or 202 reliably forwards the messages of the computing node 101 to the computing node 202.

Figure 4:
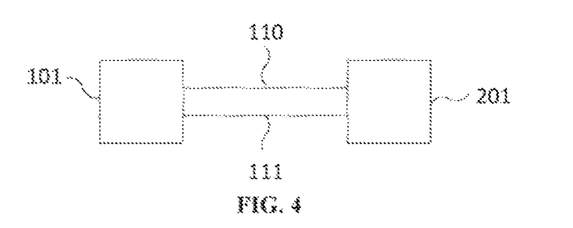
FIG. 4 shows an example of a communication between a computing node and a star coupler.
Figure 5:
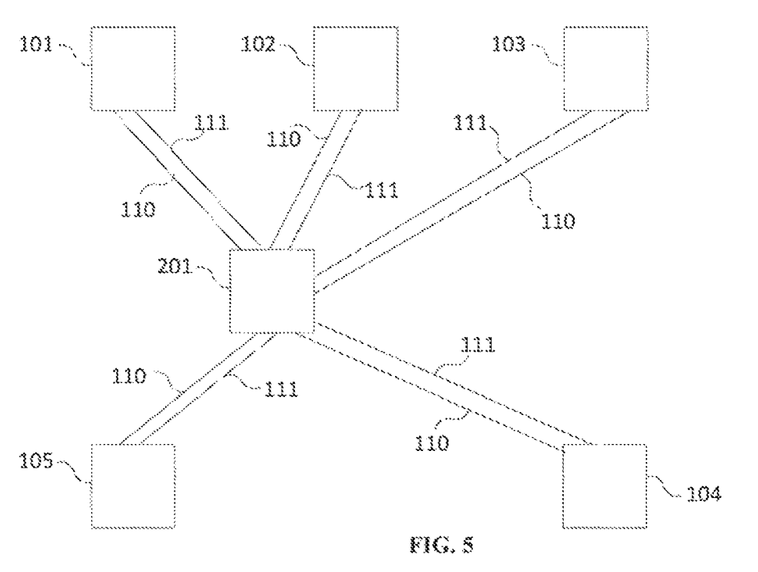
FIG. 5 shows the network from FIG. 1 with partial use of bidirectional communication lines as illustrated in FIG. 4.
Figure 6:
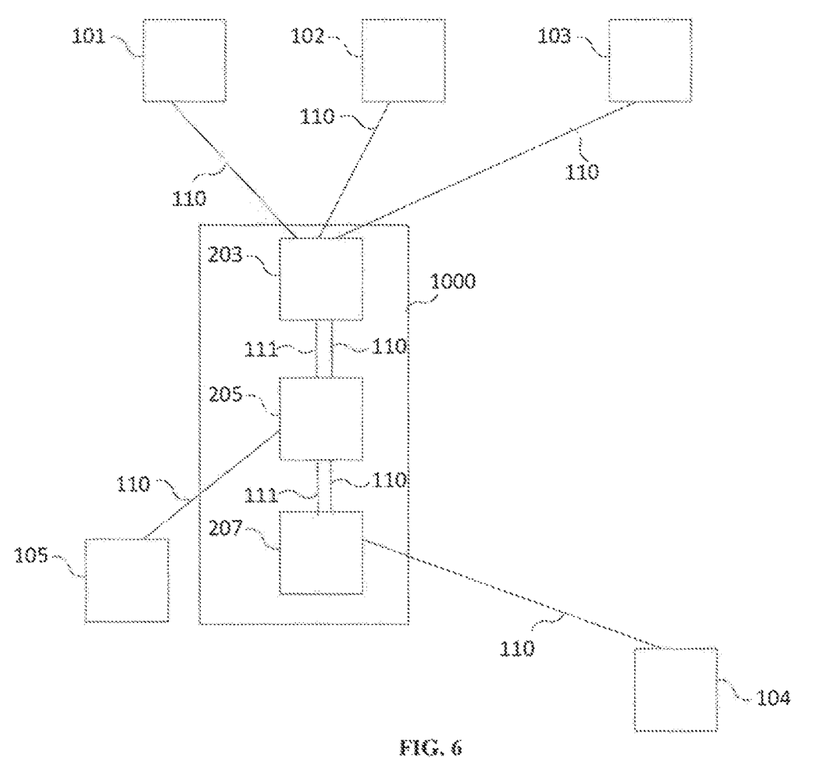
FIG. 6 shows the network from FIG. 2 with partial use of bidirectional communication lines as illustrated in FIG. 4.

FIG. 4 shows, on the basis of the example of the communication between computing node 101 and star coupler 201, that computing nodes 101-105 and star couplers 201, 202 can also be directly connected to a plurality of bidirectional communication lines 110, 111. FIG. 5 and FIG. 6 accordingly show that all of the active components 101-105, 201, 203, 205, 207 or only a proportion thereof can be connected by means of a plurality of bidirectional communication lines 110, 111.

Figure 7:
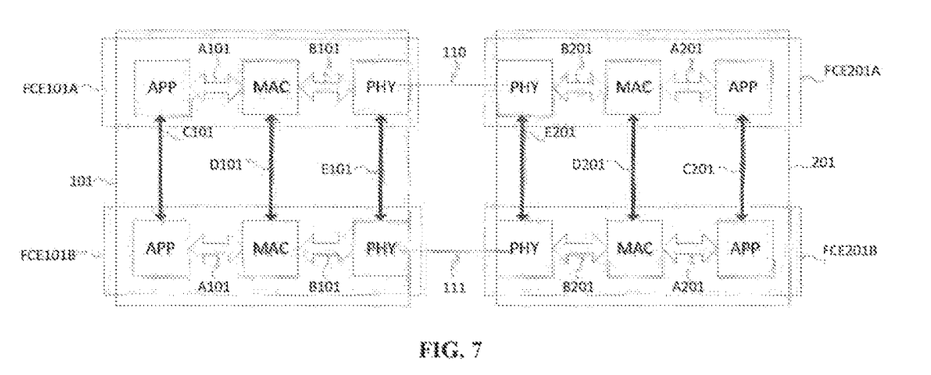
FIG. 7 shows an example of a communication between a computing node and a star coupler as well as internal details of the computing node and the star coupler.

FIG. 7 shows, on the basis of the example of the communication between computing node 101 and star coupler 201, internal details of the sender, in this case computing node 101, and of the receiver, in this case star coupler 201, of Ethernet messages. The communication layers APP, MAC and PHY both in computing node 101 and star coupler 201 are illustrated, wherein the APP layer is optional. In addition, the layers are illustrated both in the sender and in the receiver in double form (top and bottom). If an application wishes to send a message from computing node 101 to the star coupler 201, one of the APP layers (or both APP layers) in the computing node 101 sends the data to the MAC layer via the interface A101, and this in turn sends said data to the PHY layer, via the interface B101. The PHY layers in the sender 101 generate Ethernet messages that are sent to one or both communication lines 110, 111. In the receiver 201 one or more PHY layers accents/accept the Ethernet message are messages and forwards/forward this/these to the MAC and the APP layers via the interfaces B201 and A201.

In FIG. 7 optional dependences C101, D101, E101, C201, D201, E201 between the layers are shown at the top and bottom both in the sender 101 and in the receiver 201.

In the sender 101 the optional dependence C101 describes and exchange of information between the APP layers top and bottom. The optional dependence C101 can lead to an alteration of the data at the interfaces A101. For example, both APP layers (bottom and top) in the sender 101 can run the same application, which causes the same data to be generated at the interface A101 (top and bottom) in a fault-free situation. The dependence C101 can now be used by both APP layers in the sender 101 in order to check whether both APP layers (bottom and top) also actually generate the same data at the interface A101. In the event of a fault it may be that the APP layers generate different data at the interface A101. The exchange of information of the dependence C101 thus informs the two APP layers in the sender 101 of any differences at the interface A101 (bottom and top). Each APP layer can now take suitable measures to alter the data at the interface A101. These measures can even lead, in the event of detection of inconsistency in one of the APP layers (bottom or top), to the detecting APP also being able to alter the data at the interface A101 of the other APP. This can be implemented for example by a switch-off, for example by disconnection from the power supply of the sender 101, wherein both APP layers (top and bottom) can send a command in this respect to the power supply.

Similarly to the dependence C101 (exchange of information and potential alteration of the data at the interface A101 bottom and top) of the APP layers bottom and top in the sender 101, the MAC layer (bottom and top) can also provide a dependence D101, with corresponding exchange of information between the MAC layer bottom and top and potential alteration of the data at the interface B101 bottom and top.

Similarly to the dependence C101 (exchange of information and potential alteration of the data at the interface A101 bottom and top) of the APP layers bottom and top in the sender 101, the PHY layer (bottom and top) can also provide a dependence E101, with corresponding exchange of information between the PHY layer bottom and top and potential alteration of the data, which is sent in the form of Ethernet messages via the communication lines 101 and 111.

In the receiver 201 the optional dependence E201 describes an exchange of information between the PHY layer top and bottom. The optional dependence E201 can lead to an alteration of the data at the interfaces B201. For example, both PHY layers (bottom and top) in the receiver 201 can receive the same Ethernet messages from the communication lines 110 and 111, which causes the same data to be generated at the interface B201 (top and bottom) in a fault-free situation. The dependence E201 can now be used by both PHY layers in the receiver 201 in order to check whether both PHY layers (bottom and top) also actually received the same data from the communication lines 110 and 111. In the event of a fault it may be that the PHY layers receive different data from the communication lines 110 and 111. The exchange of information of the dependence E201 thus informs the two PHY layers in the receiver 201 of any differences at the communication lines 110 and 111 (bottom and top). Each PHY layer can now take suitable measures to alter the data at the interface B201. For example the two PHY layers (bottom and top) in the receiver 201, in the event of inconsistency between the Ethernet messages received from the communication lines 110 and 111, might not forward to the interfaces B201 the data corresponding to the Ethernet messages, thus again ensuring a consistent view at the interface B201 to the MAC layers top and bottom.

Alternatively or additionally to the dependence E201, the dependence D201 can be provided, which similarly to the dependence E201 constitutes the exchange of information and potential alteration of the data at the interface A201 of the two MAC layers (bottom and top) in the receiver 201. If the dependence E201 is not implemented, the MAC layer (bottom and top) can identify via the dependence D201 when different Ethernet frames are received at the communication lines 110, 111. In this case the MAC layers (bottom and top) can prevent the forwarding of the data corresponding to the Ethernet frames at the interface A201, thus ensuring a consistent view in the forwarding of the data.

Alternatively or additionally to the dependences E201 and D201, a dependence C201 can also be provided between the APP layers (bottom and top), similarly to the dependences E201 and D201. In other words the APP layers can identify via the dependence C201 whether both APP layers have received the same data via the interface A201 and for example can decide that the data will be used only when the data are identical.

FIG. 7 furthermore shows, by way of example, fault-containment units FCE101A, FCE101B, FCE201A, FCE201B. It is assumed when designing the system that the sender 101 and the receiver 201 each implement at least two fault-containment units and that at least the two MAC and PHY layers (top and bottom) are placed both in the sender 101 and in the receiver 201 in different fault-containment units.

In FIG. 7 both the sender 101 and receiver 201 each themselves form an error-containment unit.

Figure 8:
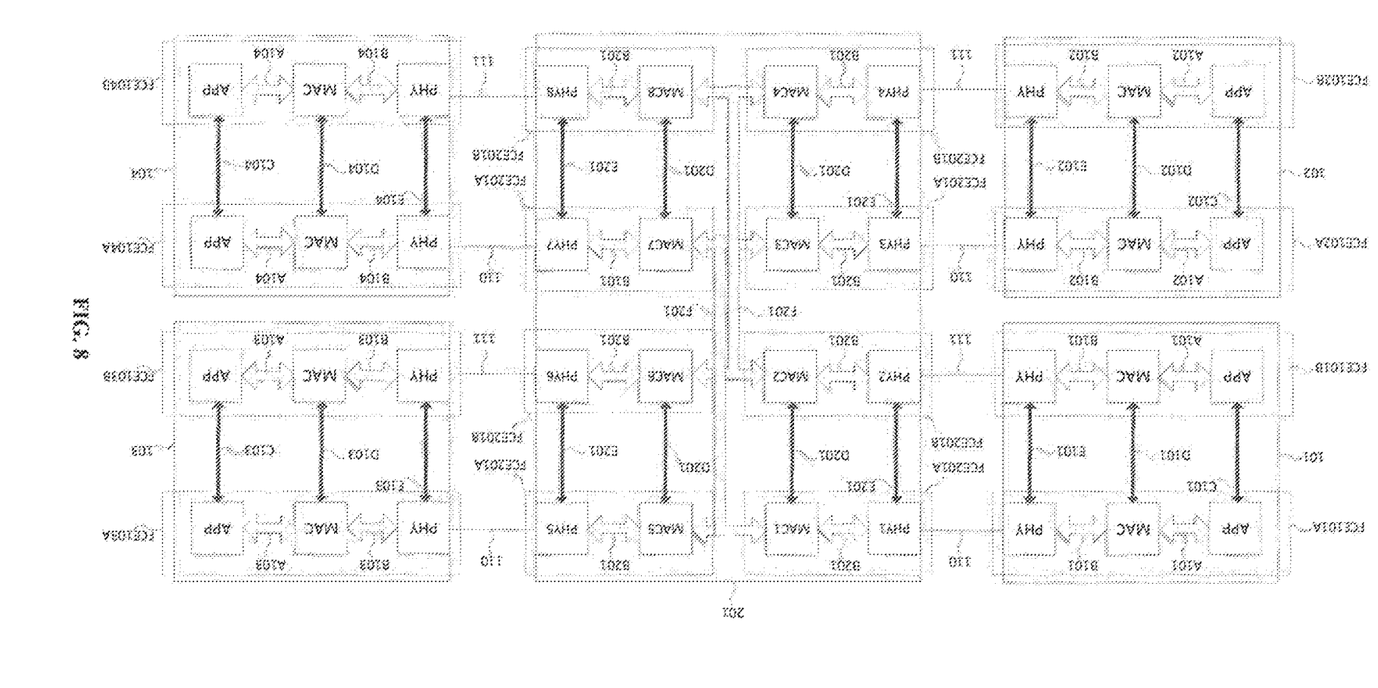
FIG. 8 shows an Ethernet network similar to that illustrated in FIG. 5, but with just four computing nodes, and also shows internal details of the computing nodes and the star coupler corresponding to FIG. 7.

FIG. 8 shows an Ethernet network similar to that illustrated in FIG. 5, but with merely four computing nodes 101-104. Furthermore, internal details of the computing nodes 101-104 and of the star coupler 201 corresponding to FIG. 7 are illustrated. As illustrated, the star coupler 201 in this example provides a plurality of PHY layers PHY1-PHY8 and a plurality of MAC layers MAC1-MAC8. Ethernet frames (Ethernet messages) of the computing nodes are received by the PHY layers from the communication lines 110, 111 and are transmitted via the interfaces B201 to the MAC layers MAC1-MAC8. The MAC layers MAC1-MAC8 then forward the data between one another in accordance with defined forwarding rules F201. In order to provide the forwarding rules F201, one, two or more central memory managements can be used, as well as local memory managements in the respective MAC layers MAC1-MAC8.

As already described with reference to FIG. 7, dependences D201, E201 can be implemented between PHY layers PHY1-PHY8 and MAC layers MAC1-MAC8, which dependences decide whether Ethernet frames received from the communication lines 110, 111 are forwarded via the interfaces B201 to the MAC layers MAC1-MAC8, are forwarded to other MAC layers MAC1-MAC8, or are rejected.

Furthermore, FIG. 8 also shows four computing nodes 101-104, which are each connected via two communication lines 110, 111 to the star coupler 201. Part of the inner structure as described with reference to FIG. 7 is also illustrated for each of the four computing nodes 101-104. In other words when sending data, the computing nodes can implement the dependences C101-C104, D101-D104, E101-E104, which decide whether data ultimately is sent in the form of Ethernet messages to the communication lines 110 and 111;

when receiving data of Ethernet messages from the communication lines 110 and 111, the computing nodes can implement the dependences C101-C104, D101-D104, E101-E104, which decide whether data is sent in the PHY, MAC and/or APP layers or is rejected.

Furthermore, FIG. 8 also shows fault-containment units FCE101A, FCE101B, FCE102A, FCE102B, FCE103A, FCE103B, FCE104A, FCE104B, FCE201A, FCE201B. The computing nodes 101-104 and the star coupler 201 accordingly each form an error-containment unit.

Figure 9:
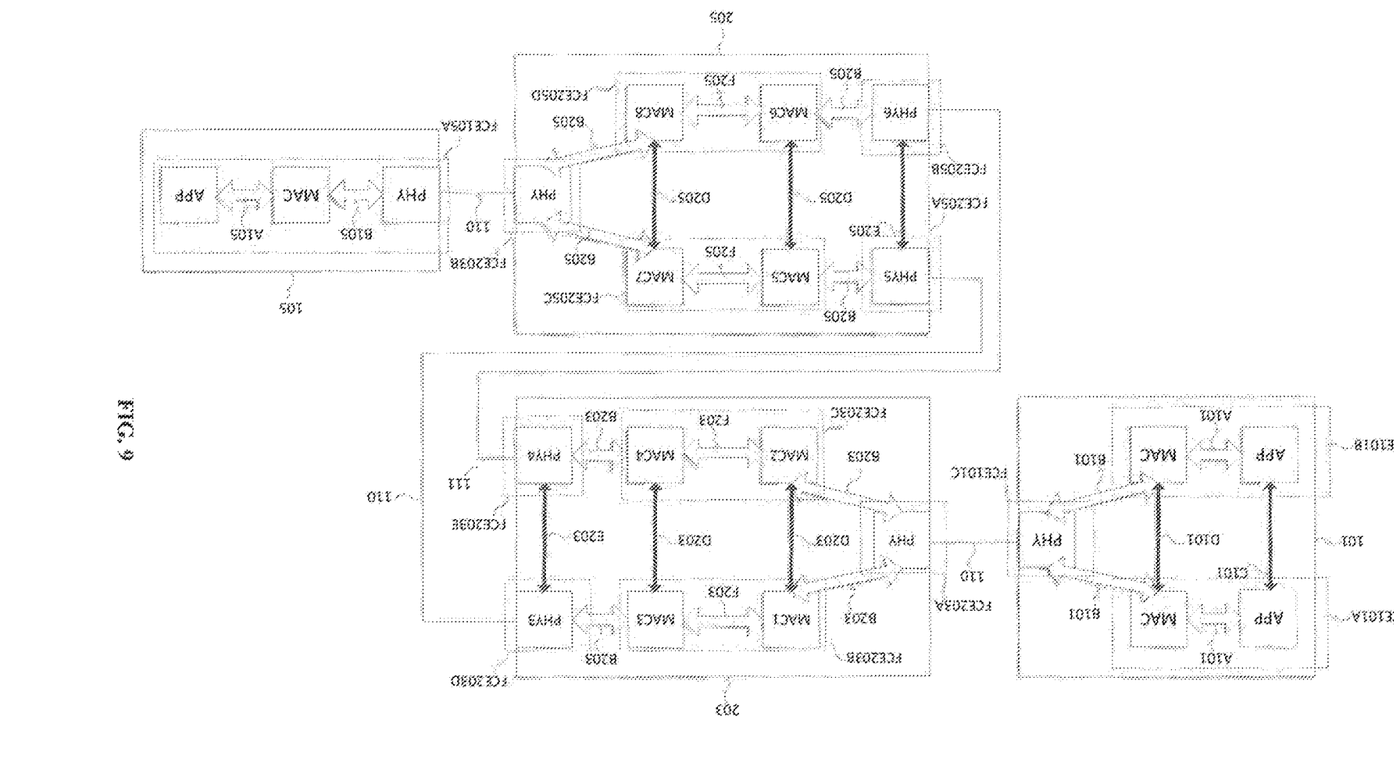
FIG. 9 shows an Ethernet network similar to that illustrated in FIG. 6, but with just two computing nodes and two star couplers, and also shows internal details of the computing nodes and the star coupler corresponding to FIG. 7.

FIG. 9 shows by way of example an Ethernet network similar to that illustrated in FIG. 6, but with only two computing nodes 101, 105 and two star couplers 203, 205. Furthermore, internal details of the computing nodes 101, 105 and of the star couplers 203, 205 are illustrated. The computing nodes 101, 105 are connected to the star couplers 203, 205 via precisely one communication line 110. The star couplers 203 and 205 are interconnected by two communication lines 110, 111.

Computing node 101 defines three fault-containment units FCE101A, FCE101B, FCE101C, and computing node 105 defines one fault-containment unit FCE105A. Star coupler 203 defines five fault-containment units FCE203A-FCE203E. The star coupler 205 likewise defines five fault-containment units FCE205A-FCE205E. This special type of definition of the fault-containment units and connection of computing nodes to the star couplers has various properties which are advantageous for the use of Ethernet in safety-critical applications:

a) The multiple communication lines 110, 111 have to be used only between the star couplers 203, 205, which significantly reduces the overall costs of the system, since communication lines 111 can be saved.

b) The arbitrary failure of one of the PHY layers in the computing nodes means that the fault can be unambiguously assigned to one computing node (or the PHY layer in the star coupler to which the computing node is directly connected).

c) The arbitrary failure of a PHY layer in one of the star couplers means that the star coupler in the worst-case scenario forwards the Ethernet messages of a computing node in distorted form, specifically when the PHY layer to which the computing node is directly connected is defective.

Figure 10:
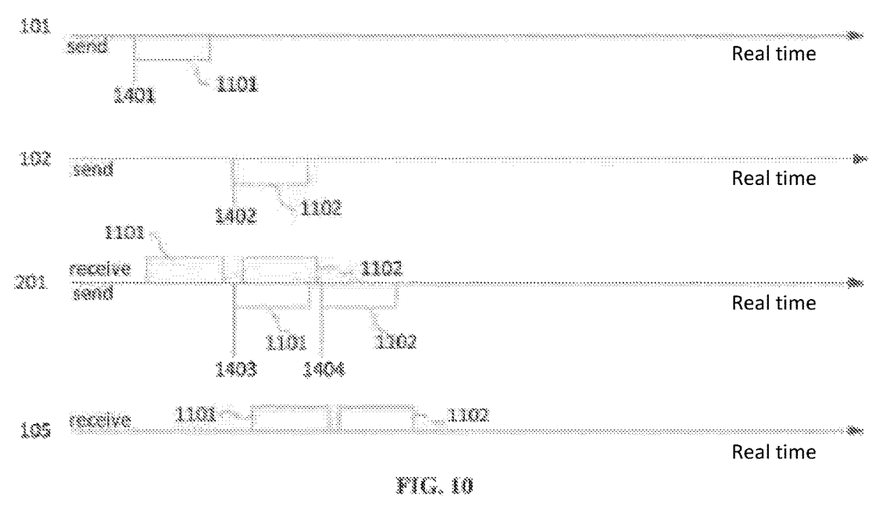
FIG. 10 shows a flow diagram illustrating time-controlled communication.

FIG. 10 shows an example on the basis of a flow diagram illustrating time-controlled communication. In the example the computing nodes 101 and 102, as illustrated in FIG. 1, transmit messages 1101 and 1102 in a time-controlled manner to the computing node 105 via the star coupler 201. The special feature of a time-controlled communication lies in the fact that the send times 1401, 1402 and/or the forward times 1403, 1404 of the time-controlled messages are known already prior to the sending of the message. This send times 1401, 1402 and/or the forward times 1403, 1404 can be determined for example already as the distributed real-time system is being designed. The determining of the send times, forward times, receive times or a subset thereof is referred to as the communication schedule.

Figure 11:
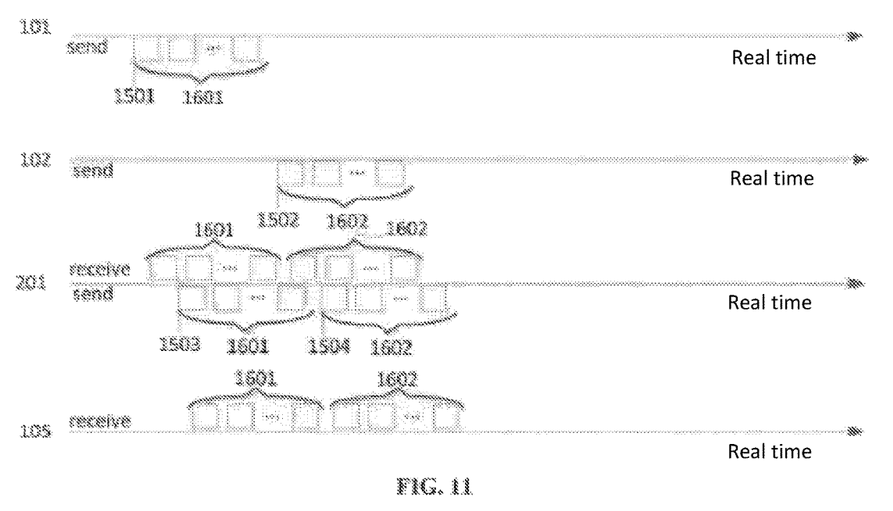
FIG. 11 shows a further exemplary flow diagram.

FIG. 11 shows a further example on the basis of a flow diagram illustrating time-controlled communication. In contrast to FIG. 10, in FIG. 11 groups 1601, 1602 of time-controlled messages are each assigned to a send time 1501, 1502 and a forward time 1503, 1504. As illustrated in FIG. 11, the assignment of messages to the groups 1601, 1602 remains unchanged. However, this does not necessarily have to be the case, and the star coupler 201 could therefore also only implement the forward time 1503 and forward all messages in the groups 1601 and 1602 when the forward time 1503 is reached. The assignment of message to a group generally can be redesigned arbitrarily for each computing node and star coupler.

To carry out the invention it may be helpful if the Ethernet frames are communicated via the communication lines 110, 111 in a time-controlled manner. In other words, if a receiver (for example star coupler 201) receives the now time-controlled messages via the communication lines 110, 111, it can be assumed that the messages belonging together are received from the communication lines 110, 111 in close chronological succession. Accordingly, the dependences between the PHY layers (for example E201) or the MAC layers (for example D201) or the APP layers (for example C201) can quickly decide whether or not the Ethernet messages belonging together are identical.

The invention claimed is:

1. A method for transmitting messages in a computer network, wherein the computer network comprises computing nodes (101-105), said computing nodes (101-105) being interconnected via at least one star coupler (201) and/or at least one multi-hop network (1000), wherein each computing node (101-105) is connected via at least one communication line (110) to the at least one star coupler (201) and/or the at least one multi-hop network (1000), and wherein the computing nodes (101-105) exchange Ethernet messages with one another and with the at least one star coupler (201) and/or the at least one multi-hop network (1000),
wherein in a set of components selected from two or more of those components comprised by the computer network those components within the set that are directly interconnected are directly interconnected in each case by two or more communication lines (110, 111), the method comprising:
sending components in the set of components send to at least two of two or more communication lines (110, 111) at least a proportion of the Ethernet messages that are to be sent, and
receiving components in the set of components then accept and/or forward at least a proportion of the Ethernet messages received via the two or more communication lines (110, 111) only if at least two identical messages are received via at least two different communication lines.

2. The method of claim 1, wherein the sending components in the set of components and/or the receiving components in the set of components consist in each case of two or more fault-containment units.

3. The method of claim 1, wherein the sending and/or receiving components in the set of components, the fault-containment units are selected in such a way that, for each component, different MAC layers are located in different fault-containment units.

4. The method of claim 1, wherein in the sending and/or receiving components of the at least one set of components, the fault-containment units are selected in such a way that, for each component, each MAC layer is allocated to precisely one of two fault-containment units.

5. The method of claim 1, wherein in the sending components in the set of components, the fault-containment units are selected in such a way that, for each component, different PHY layers are located in different fault-containment units.

6. The method of claim 1, wherein in the sending and/or receiving components in the set of components, the fault-containment units are selected in such a way that, for each component, each PHY layer is allocated to precisely one of two fault-containment units.

7. The method of claim 1, wherein in the sending and/or receiving components in the set of components, the fault-containment units are selected in such a way that each MAC layer and/or PHY layer is allocated to precisely one of two fault-containment units.

8. The method of claim 1, wherein a receiving component in the set of components forwards only one of the identical messages received by the receiving component at the least two different communication lines (110, 111).

9. The method of claim 1, wherein at least a proportion of the Ethernet messages is sent by the computing nodes in a time-controlled manner.

10. The method of claim 1, wherein at least a proportion of the Ethernet messages is forwarded by the star couplers in a time-controlled manner.

11. The method of claim 1, wherein the SAE AS602 standard or a standard based thereon or a standard following on therefrom is used in order to communicate in a time-controlled manner.

12. The method of claim 1, wherein the IEEE 802.1AS standard or a standard based thereon or a standard following on therefrom is used in order to communicate in a time-controlled manner.

13. The method of claim 1, wherein the IEEE 1588 standard or a standard based thereon or a standard following on therefrom is used in order to communicate in a time-controlled manner.

14. The method of claim 1, wherein the components in the set of components use the two or more communication lines, at moments at which no identical Ethernet messages are transmitted via two or more communication lines, for the transmission of different Ethernet messages.

15. The of claim 14, wherein a link aggregation method according to standard IEEE 802.1AX or a method based thereon or a standard following on therefrom is used to send different messages via the two or more communication lines.

16. The method of claim 1, wherein the set of components contains exclusively star couplers (201), i.e. two or more star couplers (201).

17. The method of claim 1, wherein the error-containment units are selected in such a way that each component in itself forms an error-containment unit.

18. The method of claim 1, wherein the error-containment units are selected in such a way that each star coupler (201) forms an error-containment unit.

19. The method of claim 1, wherein the error-containment units are selected in such a way that at least one computing node (101-105) together with in each case at least one star coupler (201) forms an error-containment unit.

20. The method of claim 19, wherein the error-containment units are selected in such a way that in each case precisely one computing node (101-105) together with precisely one star coupler (201) forms an error-containment unit.

21. The method of claim 1, wherein each component in the set of components is a sending component, a receiving component, or both a sending and a receiving component.

22. A computer network for transmitting messages in a computer network, wherein the computer network comprises computing nodes, said computing nodes (101-105) being interconnected via at least one star coupler (201) and/or at least one multi-hop network (1000), wherein each computing node (101-105) is connected via at least one communication line (110) to the at least one star coupler (201) and/or the at least one multi-hop network (1000), and wherein the computing nodes (101-105) exchange Ethernet messages with one another and with the at least one star coupler (201) and/or the at least one multi-hop network (1000), wherein:

- in a set of components selected from those components comprised by the computer network, i.e. computing nodes and/or star couplers and/or multi-hop networks, wherein the set comprises two or more components of this type, those components within the set that are directly interconnected are directly interconnected in each case by two or more communication lines (110, 111), and
- sending components in the set of components are configured to send to at least two of two or more communication lines (110, 111) at least a proportion of the Ethernet messages that are to be sent, and
- receiving components in the set of components are configured to accept and/or forward at least a proportion of the Ethernet messages received via the two or more communication lines (110, 111) only if at least two identical messages are received via at least two different communication lines.

23. The computer network of claim 22, wherein the sending components in the set of components and/or the receiving components in the set of components consist in each case of two or more fault-containment units.

24. The computer network of claim 22, wherein in the sending and/or receiving components in the set of components, the fault-containment units are selected in such a way that, for each component, different MAC layers are located in different fault-containment units.

25. The computer network of claim 22, wherein in the sending and/or receiving components of the at least one set of components, the fault-containment units are selected in such a way that, for each component, each MAC layer is allocated to precisely one of two fault-containment units.

26. The computer network of claim 22, wherein in the sending components in the set of components, the fault-containment units are selected in such a way that, for each component, different PHY layers are located in different fault-containment units.

27. The computer network of claim 22, wherein in the sending and/or receiving components in the set of components, the fault-containment units are selected in such a way that, for each component, each PHY layer is allocated to precisely one of two fault-containment units.

28. The computer network of claim 22, wherein in the sending and/or receiving components in the set of components, the fault-containment units are selected in such a way that each MAC layer and/or PHY layer is allocated to precisely one of two fault-containment units.

29. The computer network of claim 22, wherein a receiving component in the set of components forwards only one of the identical messages received by the receiving component at the least two different communication lines (110, 111).

30. The computer network of claim 22, wherein at least a proportion of the Ethernet messages is sent by the computing nodes in a time-controlled manner.

31. The computer network of claim 22, wherein at least a proportion of the Ethernet messages is forwarded by the star couplers in a time-controlled manner.

32. The computer network of claim 22, wherein the SAE AS602 standard or a standard based thereon or a standard following on therefrom is used in order to communicate in a time-controlled manner.

33. The computer network of claim 22, wherein the IEEE 802.1AS standard or a standard based thereon or a standard following on therefrom is used in order to communicate in a time-controlled manner.

34. The computer network of claim 22, wherein the IEEE 1588 standard or a standard based thereon or a standard following on therefrom is used in order to communicate in a time-controlled manner.

35. The computer network of claim 22, wherein the components in the set of components use the two or more communication lines, at moments at which no identical Ethernet messages are transmitted via two or more communication lines, for the transmission of different Ethernet messages.

36. The computer network of claim 22, wherein a link aggregation method according to standard IEEE 802.1AX or a method based thereon or a standard following on therefrom is used to send different messages via the two or more communication lines.

37. The computer network of claim 22, wherein the set of components contains exclusively star couplers (201), i.e. two or more star couplers (201).

38. The computer network of claim 22, wherein the error-containment units are selected in such a way that each component in itself forms an error-containment unit.

39. The computer network of claim 22, wherein the error-containment units are selected in such a way that each star coupler (201) forms an error-containment unit.

40. The computer network of claim 22, wherein the error-containment units are selected in such a way that at least one computing node (101-105) together with in each case at least one star coupler (201) forms an error-containment unit.

41. The computer network of claim 40, wherein the error-containment units are selected in such a way that in each case precisely one computing node together with precisely one star coupler (201) forms an error-containment unit.

42. The computer network of claim 22, wherein each component in the set of components is a sending component, a receiving component, or both a sending and a receiving component.

* * * * *